United States Patent [19]

Jean et al.

[11] Patent Number: 4,584,789
[45] Date of Patent: Apr. 29, 1986

[54] APPARATUS FOR ENHANCING THE DEVELOPMENT OF MICROORGANISMS NEEDED TO PROMOTE THE GROWTH AND DEVELOPMENT OF VEGETATION

[76] Inventors: Gilbert Jean; Maurice Jean, both of 100, rue des Moulins, 26000 Valence, France

[21] Appl. No.: 563,529

[22] Filed: Dec. 20, 1983

[30] Foreign Application Priority Data

Dec. 20, 1982 [FR] France .................. 82 21605

[51] Int. Cl.⁴ .......................................... A01G 17/00
[52] U.S. Cl. ..................................................... 47/25
[58] Field of Search ............... 47/25, 23, 24, 27, 32, 47/165, 26, 30; 52/298

[56] References Cited

U.S. PATENT DOCUMENTS

| | | | |
|---|---|---|---|
| 219,987 | 9/1879 | Scott | 47/23 |
| 283,837 | 8/1883 | Wallace | 47/23 |
| 635,397 | 10/1899 | Schlaefer | 47/24 |
| 1,674,118 | 6/1928 | Merrick | 47/24 |
| 2,978,837 | 4/1961 | Daniels | 47/25 |
| 4,366,646 | 1/1983 | Pratt | 47/17 |

FOREIGN PATENT DOCUMENTS

| | | |
|---|---|---|
| 1782101 | 7/1971 | Fed. Rep. of Germany . |
| 1357381 | 7/1964 | France . |
| 2129266 | 10/1972 | France . |
| 2356361 | 3/1978 | France ............... 47/23 |
| 2433291 | 3/1980 | France . |
| 2484773 | 12/1981 | France . |
| 623721 | 6/1981 | Switzerland ............... 47/27 |
| 769696 | 3/1957 | United Kingdom . |

Primary Examiner—Robert A. Hafer
Assistant Examiner—Bradley M. Lewis
Attorney, Agent, or Firm—Sandler & Greenblum

[57] ABSTRACT

An apparatus is provided which promotes and enhances the development of microorganisms in the ground, which microorganisms are indispensible for promoting the growth of vegetation, including plants and trees, by recycling water and circulating air to the zone in which the roots of the vegetation are located. The apparatus includes a relatively severely flared, frustoconical skirt portion which is adapted to cap the roots of vegetation within the ground. It also incorporates a small, generally cylindrical collar which extends above the ground and which surrounds the trunk of the vegetation being protected. A plurality of drains, formed by channels along the interior surface of the skirt and collar, extend over the length of generatrices of the apparatus and serve to conduct water and air to the roots of the vegetation. The apparatus is formed by two identical members, each of which has a dimension greater than one-half of the collar and one-half of the skirt. These two portions overlap when attached and are connected by a flexible band or similar member. In addition to maintaining a fertile zone in which the roots of plants, trees and other vegetation can flourish, the apparatus protects plants from ingrowth of undesirable weeds and damage which occurs from the use of small agricultural tools.

14 Claims, 4 Drawing Figures

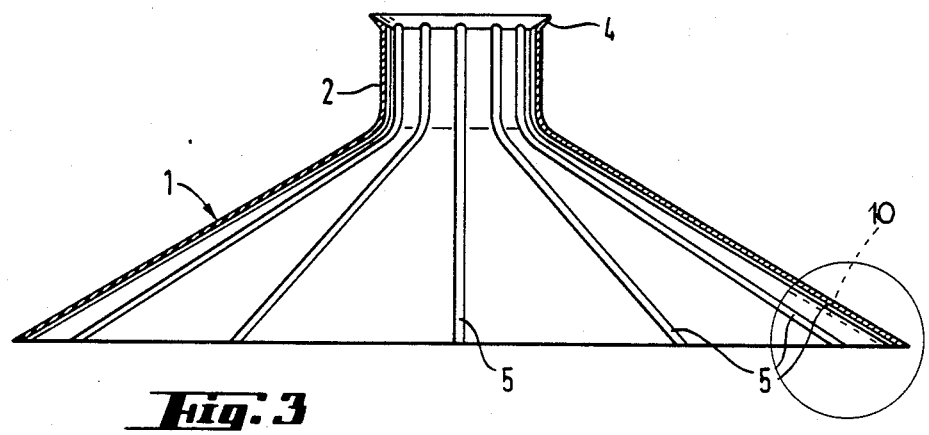
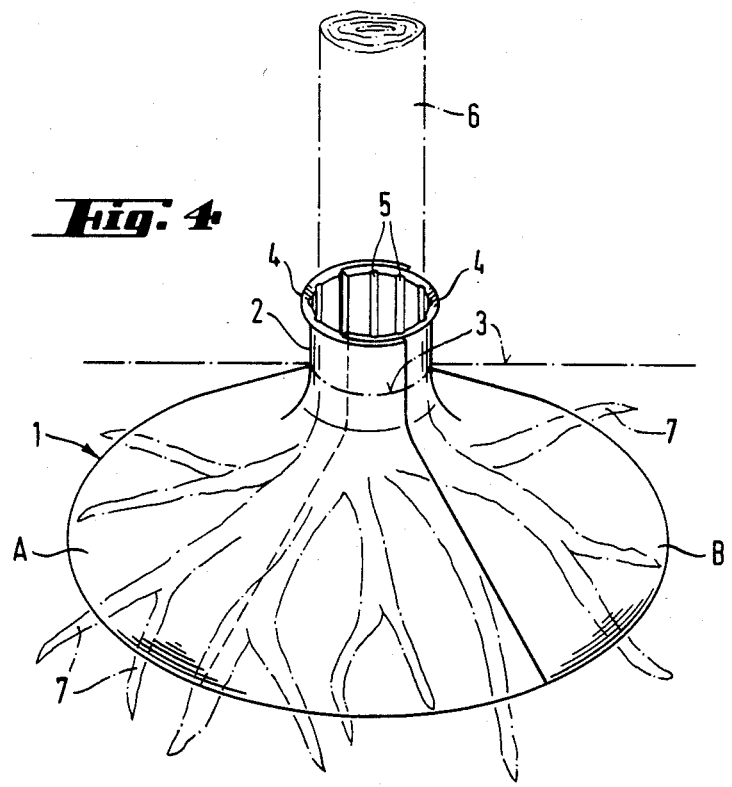

APPARATUS FOR ENHANCING THE DEVELOPMENT OF MICROORGANISMS NEEDED TO PROMOTE THE GROWTH AND DEVELOPMENT OF VEGETATION

BACKGROUND OF THE INVENTION

1. Field of the Invention

The present invention generally relates to apparatus for promoting and increasing the proliferation and development of microorganisms necessary to enhance the development of plants, trees and other vegetation, and more specifically to apparatus which enhances and promotes such growth by supplying water and air to the vegetation while protecting the roots of the same.

2. Discussion of Prior Art

Presently, the development of bushes, trees, conifers and vegetation is often retarded and delayed; occasionally, even progressive decay of the vegetation and plant life occurs. This phenomenon occurs in ornamental gardens, compact terrain/soil, and even in terrain or soil which is covered with plants or grass, e.g., meadows.

The principal cause of the retardation and failure of such plant life results from conditions which are inappropriate to enhance the satisfactory development of soil microorganisms, and which often retard root exchanges which are indispensible to the proper development of such vegetation.

French Pat. No. 2,484,773 discloses a protective bell type jar for the base of a vine. This jar comprises plastic material and has a single central opening to permit growth of a plant, a guidance zone attached to the opening which has a wall which is slightly curved in the direction of the opening, and a placement zone in the form of a truncated cone. This device, however, protects the plant or other vegetation above ground only, with only a relatively small portion of the base of the bell jar adapted to be partially or totally buried. Even if this apparatus prevents the ground from drying, it is inconvenient insofar as it collects all rainwater, and as a result can provide an undesirable excess of water to the vegetation which will result in rotting of such vegetation. The bell jar which is used is generally positioned above ground, and the small collar simply acts to guide growth of the vegetation.

French Pat. No. 2,433,291 discloses a saucer or dish which protects and improves the cultivation of a variety of small plants. The saucer or dish comprises two portions which are closely assembled in face to face contact about the base of a plant. The saucer has at its center a circular surface with a central hole for permitting passage of the base of the plant; the apparatus also includes two circular surfaces. One of the circular surfaces is located centrally of the apparatus and rises from the center of the saucer towards its edge. The second circular surface extends about the first surface but is instead directed downwardly. This device is utilized only for small plants, and its two facing portions preserve the humidity for the plants. A portion of the apparatus is located on the surface of the ground, and the connection of the two portions which form the device is fixed; thus, the two portions are not capable of extending or expanding during the course of development of vegetation.

French Pat. No. 2,129,266 discloses a garden pot which comprises a disk formed of flexible material. The disk has a central bore and is split along one radius thereof in order to permit the edges of the disk to overlap and form a type of funnel. This apparatus is adapted to be positioned on the upper surface of a pot and causes the water used to supply the plants with liquid via convergence of the disk towards the central aperture of the funnel.

French Pat. No. 1,357,381 describes a small cup for protecting vegetation against intrusion by weeds, dry weather, heat or cold. Its bowl configuration permits recovery of dripping water but can also lead to oversaturation and undesirable humidity, which is disruptive to vegetation and which constitutes a definite hindrance to the development of plants even though it is formed from a porous material.

Such devices are adapted to protect vegetation but are not adapted to measure or control the accumulation of water or manure supplied to the plants. The failure to be able to do this causes the vegetation to rot or be destroyed due to a surplus of these materials. Additionally, the apparata are generally adapted to be positioned on the surface of the ground, or have only the end or the edges of their bases positioned within the ground. These devices comprise one or two preassembled elements. Further, their shape, whether bell jar, dish, small cup, or bowl, result in the disadvantageous results which are described herein.

SUMMARY OF THE INVENTION

The present invention is provided for in a first aspect thereof by an apparatus for enhancing the development of microorganisms necessary for promoting the growth of vegetation having roots. The apparata is adapted to be at least partially buried under the surface of the ground in which the vegetation is buried. The apparatus comprises a frustoconical skirt adapted to be completely buried underground and adapted to cap the upper portion of the roots when it is buried. The skirt has inner and outer surfaces, a relatively wide lower edge, and a relatively narrow upper portion. The apparatus also comprises a collar connected to the upper skirt portion, the collar having inner and outer surfaces and being adapted to extend above the surface of the ground when the skirt is buried underground. The apparatus also includes a plurality of drains, each of the drains comprising a recessed groove positioned along the inner surface of each of the collars and the skirt.

The skirt and collar are formed by two identical overlapping members, each of the members having dimensions which are each slightly greater than one-half of the total size of the skirt and one-half of the total size of the collar.

Each of the drains extends along the inner surfaces over the length of a generatrix of the apparatus. These drains comprise essentially parallel channels, grooves or recesses along the skirt and collar.

An elastic connector is adapted to be positioned about the collars of the overlapping members to maintain them flexibly connected to each other. In this fashion, as a plant or other vegetation expands, the device can expand to accommodate the growing plant or other vegetation. The collar is generally cylindrical, and each of the identical members comprises relatively thick, impermeable plastic material. Each of the members can comprise one inner layer and at least one outer layer. At least the inner layer of these types of constructions, in one embodiment of the invention, is formed from biodegradable material or nutrients which serve to feed the plants.

The collar has a free upper edge which is angled and which projects outwardly from the center of the collar and forms one end of each of the drains. The skirt is relatively severely flared outwardly and downwardly from a lower portion of the collar in order to form a cap for all of the roots of the plant. The recessed portions which form the drains can comprise grooves, and the drains serve as a means for supplying the roots with both water and air necessary to promote the development of the microorganisms and vegetation. The provision of drains in this fashion effectively meters the amount of water which can be supplied to the roots, as an excess of water cannot fit into the drain and thus will flow over the top of the roots and outwardly over the frustoconical skirt and away from the vegetation.

It is, therefore, a general object of the present invention to provide a new and improved apparatus for enhancing the growth of plants and other vegetation by promoting the development of microorganisms.

Another object of the present invention is to advantageously function to promote a particularly favorable environment for the development of microorganisms in the earth, and to promote root exchanges by providing a continuous, satisfactory humidity for development of vegetation, and adequate aeration of the roots of vegetation, both of which are indispensible to vegetation growth.

Still a further object of the present invention is to provide an apparatus which can conduct a small but sufficient amount of rain or other water to plant roots, and to prevent excess water from reaching the roots, in order to again promote implantation and extension of the tree or vegetation roots within the ground, and to also prevent the vegetation from rotting, which also results from overwatering.

Yet a further object of the present invention is to provide a new and improved apparatus for enhancing the development of microorganisms in the ground which provides a desired reserve of confined air favorable to promoting the development of microorganisms, which is necessary to further the development of plants and vegetation, and which also promotes root exchanges.

Another goal of the present invention is to provide a new and improved apparatus for enhancing the development of microorganisms in the ground which permits internal condensation close to the roots of vegetation to assure a supply of water for the plants during hot and dry periods of the year, when plants require more water; and to provide water to the vegetation in hot and dry regions which lack water.

Still another object of the present invention is to provide for continuous regulation of the temperature in the zone of the roots of the vegetation.

Still a further object of the present invention is to provide an apparatus for enhancing the development of microorganisms in the ground which additionally protects the vegetation roots from weeds, and which cannot penetrate into either the vital zone of growth of the vegetation, nor the root zone of the vegetation, particularly at the beginning of recovery of the plant after planting. It additionally permits the planting of grass near the tree because of the isolation of the roots, via a collar and skirt, from the exterior vegetation.

In accordance with one preferred embodiment of the present invention, a truncated conical skirt is formed of plastic in two partially overlapping members, each of the portions including a small collar extending upwardly from the conical skirt, the collars and hence the portions being flexibly connected by an elastic member which permits the plant, tree or other vegetation to force the sections apart as a function of the natural growth and expansion of the trunk and root of the vegetation.

The above and other objects, advantages and features of the present invention will become more fully apparent to those of ordinary skill in the art to which this invention pertains upon further review of this application.

BRIEF DESCRIPTION OF THE DRAWINGS

All of the details, features and advantages of the present invention will become more fully apparent to those of ordinary skill in the art to which this invention pertains from a review of the following brief description of the drawings, together with the detailed description of the drawings which follows, the claims, and the appended drawings. In the drawings, like reference numerals refer to like parts throughout, wherein:

FIG. 3 is a sectional view of the apparatus of FIG. 1, a cutaway portion being used in FIG. 3 to illustrate a second embodiment of the present invention in which the apparatus comprises a plurality of layers including at least one biodegradable layer; and FIG. 4 is a perspective view, on a reduced scale, of the apparatus shown as capping the roots of a plant or tree under ground.

DETAILED DESCRIPTION OF THE DRAWINGS

Figure 1:
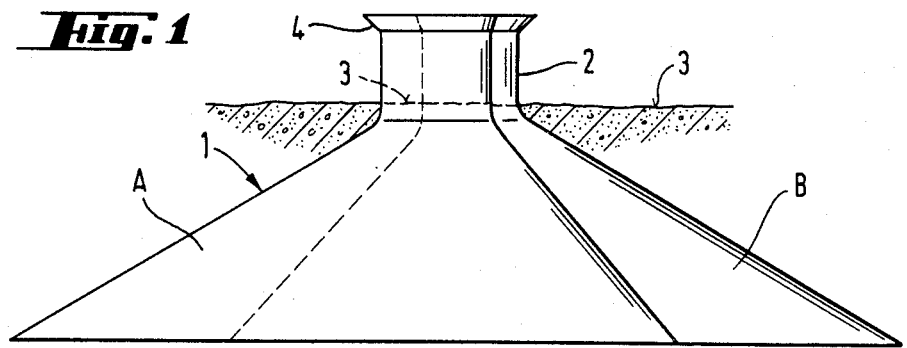
FIG. 1 is a vertical plan view of the apparatus used to enhance the development of microorganisms in the ground.
Figure 2:
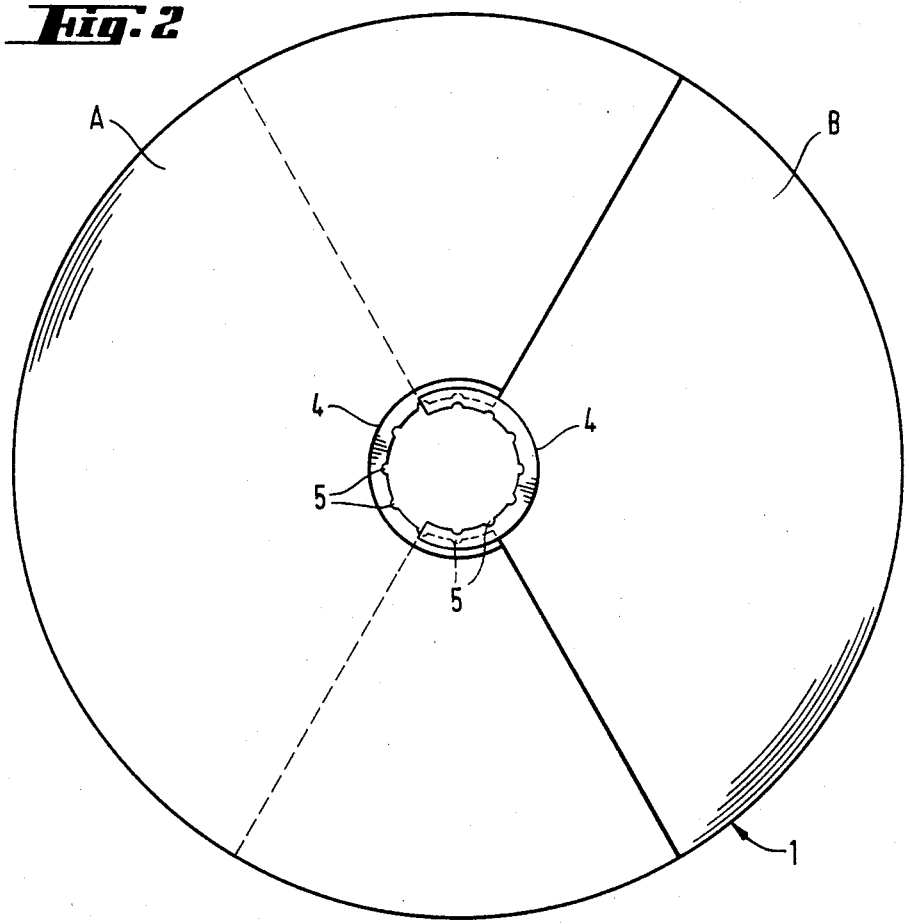
FIG. 2 is a top plan view of the apparatus of FIG. 1.

The present invention will now be described in greater detail with respect to the drawings attached hereto. FIGS. 1-4 illustrate the apparatus as comprising two identical portions or members A and B that are adapted to be connected facing one another. The edges of one of the devices are adapted to penetrate, or be inserted between, the edges of the other member, as best shown in FIGS. 2 and 4. In this fashion, the lower portions of the members form a frustoconical skirt 1, the upper portions of each member joining to form a small collar 2 which partially overlaps in the same way that the skirt portions overlap. The skirt portions are relatively severely flared from the bottom of the collar portions of each member. The identical members are adapted to be connected to form a unitary assembly by an elastic band or similar member 2, which essentially surrounds the collar portions of the device in a flexible fashion. Each member A and B has a dimension which is slightly greater than half of the frustum of the cone represented by skirt 1, and slightly greater than half of the cylinder which represents collar 2. In this fashion, the members can overlap and form a unitary apparatus. By providing for a flexible connection between the members, the apparatus is capable of expanding upon the growth of a plant or other vegetation which is retained thereby. The top of collar 2 is provided with a small projection or edge 4 which flares outwardly from the upper portion of collar 2. A plurality of drains 5, in the form of channels, recesses or grooves, are hollowed from the interior surface of collar 2 and skirt 1, along a generatrix of the solid surface represented by the apparatus. The generatrices are best represented in FIG. 3, and are substantially parallel to one another.

The truncated conical skirt 1, which is formed by the connection of the sloping lower portions of members A and B, is adapted to be buried totally beneath the ground. It has a relatively severe slope which is sufficient to enable the lower edge to terminate at a point approximately equal to the depth at which roots 7 of a plant, tree or other vegetation within the ground are located. The skirt is thus adapted to be positioned on the roots of the vegetation which have been previously lightly covered with dirt prior to insertion of the device into the ground. Only the relatively small collar 2 extends above the ground; this collar is adapted to surround trunk 6 of a bush, tree or other vegetation.

The apparatus preferably comprises plastic; it can be a single plastic layer, or can comprise several layers having the characteristics necessary to promote proper condensation within the area defined by the skirt to enhance and promote root growth. At least the inner most layer of such a structure, if necessary, can be biodegradable or can be adapted to serve in its entirety or as a portion thereof as a plant nutrient. This is illustrated by layer 10 in the cutaway portion of FIG. 3.

Rain or other water can enter the system to feed the roots via one end of the drain which is located at the level of edge 4 of the collar. Water will enter the drains at this point and will flow downwardly towards roots 7 along the channels, grooves or recesses which form drains 5. This enhances planting and causes the roots to spread underground.

In the event of an overabundance of water, which would be detrimental to vegetation, excess water is directed away from roots 7 by dripping action at the surface of the apparatus and overflow onto the ground and the upper surface of skirt 1. This prevents excess water from reaching the roots.

When drains 5 are not saturated with water, they form, between the roots and the truncated conical skirt, a plurality of confined air storage areas. These areas are necessarily provided to enhance the proper development of the life of the microorganisms which grow in the ground and which are indispensible to vegetation growth, and to rootlet exchanges, and which are constantly renewed.

Truncated conical skirt 1 is formed from a sufficiently thick and impermeable material to permit condensation within the area which it defines beneath the ground, close to the roots, to provide an additional water supply for the vegetation which it substantially encloses. Collar 2 and skirt 1 assure an essentially metered supply of rain and/or other water by virtue of their combined structure and the condensation phenomenon which occurs. The structure and condensation result in a substantially continuous recycling of water at the level of the root while nonetheless preventing evaporation of such water. The recycling of the water, and the small amounts of air circulating, permit natural regulation of the temperature at the level of the roots. Connection 3 has a sufficient elasticity to maintain members A and B of the apparatus in a partially overlapping position, and to permit the overlap to be reduced in the course of development of vegetation, both at the level of trunk 6, and at the level of roots 7.

Truncated conical skirt 1 serves to protect against undesirable vegetation which would otherwise compete with the plant, tree or other vegetation being cultivated in the zone which is vital for the growth of such latter vegetation, the zone being substantially defined by the skirt. The apparatus does not, however, prevent the planting of grass in the vicinity of protected vegetation, insofar as there is an area located between the upper surface of the ground and the upper surface of the conical skirt, as seen in FIG. 4, which would permit the growth of grass without interference with the roots of the vegetation being protected. This apparatus equally protects the vegetation being protected from harm which would result from the use of small agricultural tools in an area adjacent to the vegetation.

The apparatus can be used for several years, as long as the plant, vegetation or tree is alive, or can be used a plurality of times if it is for vegetation having a relatively short life. The apparatus can be used to protect any vegetation, in all environments, and both during and after planting.

It is evident that a variety of modifications can be made to the apparatus which has been described above, particularly to improve the stability or the protective action for the base of the tree, e.g., a slight increase in the height of the collar can be provided to increase protection of the tree base 6 without going beyond the scope of the invention.

Furthermore, it should be understood that although the present invention has been described with respect to a particular means, materials and embodiments, it is not so limited and extends to all equivalents within the scope of the claims.

What is claimed is:

1. Apparatus for enhancing the development of microorganisms necessary for promoting the growth of plants, trees and other vegetation having roots, said apparatus adapted to be at least partially buried under the surface of ground in which said vegetation is growing, said apparatus comprising:
   (a) a frustoconical skirt adapted to be buried underground and adapted to cap said roots, said skirt having inner and outer surfaces, a relatively wide lower edge, and a relatively narrow upper portion;
   (b) a substantially cylindrical collar connected to said upper skirt portion, said collar having inner and outer surfaces and being adapted to extend above the surface of said ground and surround the trunk of said plant once said skirt is buried under ground; and
   (c) a plurality of drains, each of said drains comprising a unitary and continuous channel extending along the inner surface of both said collar and said skirt said drains acting to transport water running down said trunk along said channels to said skirt and depositing water adjacent to said plant roots.

2. Apparatus in accordance with claim 1 wherein said skirt and collar are formed by two identical overlapping members, each of said overlapping members having dimensions which are slightly greater than the dimensions of one-half of said skirt and one-half of said collar, each of said members having a free edge, the free edge of one of said members being positioned within the free edge of the other of said members.

3. Apparatus in accordance with claim 2 wherein each of said drains extends along said inner surfaces over the length of a generatrix of said apparatus.

4. Apparatus in accordance with claim 2 further comprising an elastic connector positioned about the collar portions of said overlapping members to maintain the members flexibly connected to each other.

5. Apparatus in accordance with claim 4 wherein said collar is generally cylindrical.

6. Apparatus in accordance with claim 2 wherein each of said members comprises relatively thick plastic material which is impermeable to air and water.

7. Apparatus in accordance with claim 2 wherein each of said members comprises one inner layer and at least one outer layer.

8. Apparatus in accordance with claim 7 wherein at least said inner layer is formed from biodegradable material.

9. Apparatus in accordance with claim 1 wherein said collar has a free upper edge, said upper edge projecting outwardly from the center of said collar to form entrances for said drains.

10. Apparatus in accordance with claim 1 wherein said skirt is relatively severely flared outwardly from a bottom portion of said collar.

11. Apparatus in accordance with claim 1 wherein said drains comprise means for conducting water and air to said roots.

12. Apparatus for enhancing the development of microorganisms necessary for promoting the growth of plants, trees and other vegetation having roots, said apparatus adapted to be at least partially buried under the surface of ground in which said vegetation is growing, said apparatus comprising:
 (a) a frustoconical skirt adapted to be buried underground and adapted to cap said roots, said skirt having inner and outer surfaces, a relatively wide lower edge, and a relatively narrow upper portion;
 (b) a collar connected to said upper skirt portion, said collar being substantially cylindrical and having inner and outer surfaces and an upper edge, said collar being adapted to extend above the surface of said ground and surround the trunk of said plant when said frustoconical skirt is buried under said ground; and
 (c) a plurality of drains, each of said drains comprising a continuous channel extending along the inner surface of said frustoconical skirt and said substantially cylindrical collar, each of said drains extending from a point substantially adjacent to said collar upper edge to a point substantially adjacent to said relatively narrow lower edge of said frustoconical skirt said drains acting to transport water running down said trunk along said channels to said skirt and depositing water adjacent to said plant roots.

13. A method for promoting the development of microorganisms necessary to promote the growth of plants, trees and other vegetation having roots, said method using an apparatus which is adapted to be at least partially buried under the surface of ground in which said vegetation is growing, said apparatus comprising a substantially frustoconical skirt which is provided to overlay said roots, said skirt having inner and outer surfaces, a relatively wide lower edge, and a relatively narrow upper portion, and a collar connected to said relatively narrow upper portion of said skirt, said collar having inner and outer surfaces and being adapted to extend above the surface of said ground when said skirt is buried under said ground, said apparatus further comprising a plurality of drains extending along the inner surface of said collar and of said skirt, said method comprising:
 (a) burying said frustoconical skirt completely under the surface of said ground in which said vegetation is growing, so that only a portion of said collar will extend above the surface of said ground;
 (b) positioning said apparatus so that said collar portion will surround at least a portion of the base of vegetation which extends above the upper surface of said ground; and
 (c) conducting water and air to the roots of said vegetation via said plurality of drains located along the inner surfaces of said collar and said skirt.

14. A method in accordance with claim 13 wherein each of said skirt and said collar are formed by two overlapping members, each overlapping member having dimensions slightly greater than the dimensions of one-half of the dimension of said skirt and one-half of the dimension of said collar, said method further comprising tightening said overlapping collar members against said tree by placing a substantially elastic connecting band about said collar.

* * * * *